(12) United States Patent
Eckel et al.

(10) Patent No.: US 6,940,449 B2
(45) Date of Patent: Sep. 6, 2005

(54) METHOD FOR ELIMINATING DUMMY OBJECTS SHORT-RANGE PULSE RADAR SENSORS

(75) Inventors: Matthias Eckel, Frankfurt (DE); Juergen Hoetzel, Florstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/489,022

(22) PCT Filed: Apr. 2, 2003

(86) PCT No.: PCT/DE03/01082

§ 371 (c)(1),
(2), (4) Date: Mar. 8, 2004

(87) PCT Pub. No.: WO03/107034

PCT Pub. Date: Dec. 24, 2003

(65) Prior Publication Data

US 2004/0239554 A1 Dec. 2, 2004

(30) Foreign Application Priority Data

Jun. 14, 2002 (DE) ........................ 102 26 576

(51) Int. Cl.⁷ .............................................. G01S 13/08
(52) U.S. Cl. ........................ 342/137; 342/134; 342/202
(58) Field of Search ................................ 342/134, 137, 342/202

(56) References Cited

U.S. PATENT DOCUMENTS

| | | | |
|---|---|---|---|
| 3,526,894 A | 9/1970 | Guilhem et al. | |
| 5,079,556 A | 1/1992 | Iton | |
| 5,410,750 A | * 4/1995 | Cantwell et al. | 455/306 |
| 5,680,417 A | * 10/1997 | Carlson | 375/257 |

FOREIGN PATENT DOCUMENTS

| | | | |
|---|---|---|---|
| EP | 0291337 | * 11/1988 | G01S/13/20 |
| RU | 2 141 151 | 11/1999 | |
| WO | 98/47022 | 10/1998 | |

* cited by examiner

*Primary Examiner*—Ian J. Lobo
(74) *Attorney, Agent, or Firm*—Michael J. Striker

(57) ABSTRACT

In order to create a method for eliminating dummy objects in short-range pulse radar sensors, in which radar pulses are transmitted at a defined frequency, and the time until they are reflected by an object and received again is measured, and besides the transmitted pulse (TX pulse), a delayed second pulse (RX pulse) is generated, which avoids the known disadvantages of the prior art and with which the elimination of dummy objects in short-range pulse radar sensors can be assured, it is provided that the transmitted pulses (TX pulses) and the additionally generated second pulses (RX pulses) delayed relative to them are modulated by a binary phase-shift keying process.

3 Claims, 1 Drawing Sheet

US 6,940,449 B2

METHOD FOR ELIMINATING DUMMY OBJECTS SHORT-RANGE PULSE RADAR SENSORS

FIELD OF THE INVENTION

The invention relates to a method for eliminating dummy objects in short-range pulse radar sensors, in which radar pulses are transmitted at a defined frequency, and the time until they are reflected by an object and received again is measured. Besides the transmitted pulse (TX pulse), a delayed second pulse (RX pulse) is generated.

PRIOR ART

Known short-range pulse radar sensors exist, which are primarily used in vehicles for monitoring the surrounding area. In English these sensors are called short range radar (SRR) sensors. These sensors often have interference effects.

One of the interference effects is that objects that are located far outside the measurement range are, under certain circumstances, displayed as "dummy objects" inside the measurement range. The measurement range is described by the range within which an object detection is intended to take place. This range is designed such that it is a fractional range of half the distance traversed by the radar wave in the measurement cycle time. The measurement cycle time is defined by the repetition rate of the individual measurement. The dummy objects are the results of reflections from the previous measurement.

Examples of this usage are described in Russian Patent RU 2141151 C1 and in International Patent Disclosure WO 9847022 A.

While in RU 2141151 C1, the structural design of a "strip phase shift" is described, in WO 9847022 A, a Doppler radar warning system is disclosed, which essentially comprises a transmitter for generating two analog signals, which are reflected by an object, and a computer with a memory for converting the analog signals into a digital signal that corresponds to the phase shift of the original signals.

SUMMARY OF THE INVENTION, OBJECT, EMBODIMENT, AND ADVANTAGES

It is the object of the present invention to avoid the known disadvantages of the prior art and to disclose a method with which the elimination of dummy objects in short-range pulse radar sensors can be assured.

This object is attained by a method of the type defined above that has the characteristics defined in claim 1.

Accordingly, the method is characterized in that the transmitted pulses and the additionally generated second pulses delayed relative to them are modulated by a binary phase-shift keying process.

The method of the invention having the characteristics recited in claim 1 offers the advantage that as a result of the propose type of phase shift between the transmitted pulses, simple elimination of "dummy objects" is possible.

In a preferred feature of the invention, the phase shift is realized in that the transmitted pulses are modulated by introducing a phase shift of 180° between the transmitted pulse (TX pulse) and the delayed second pulse (RX pulse) in such a way that at least two successive pulses always have the same phase, and at least the next two pulses are shifted by 180°.

BRIEF DESCRIPTION OF THE DRAWINGS

The invention is described in further detail below in an exemplary embodiment in conjunction with the accompanying drawings. Shown are.

BEST MODE FOR EMBODYING THE INVENTION

Figure 1:
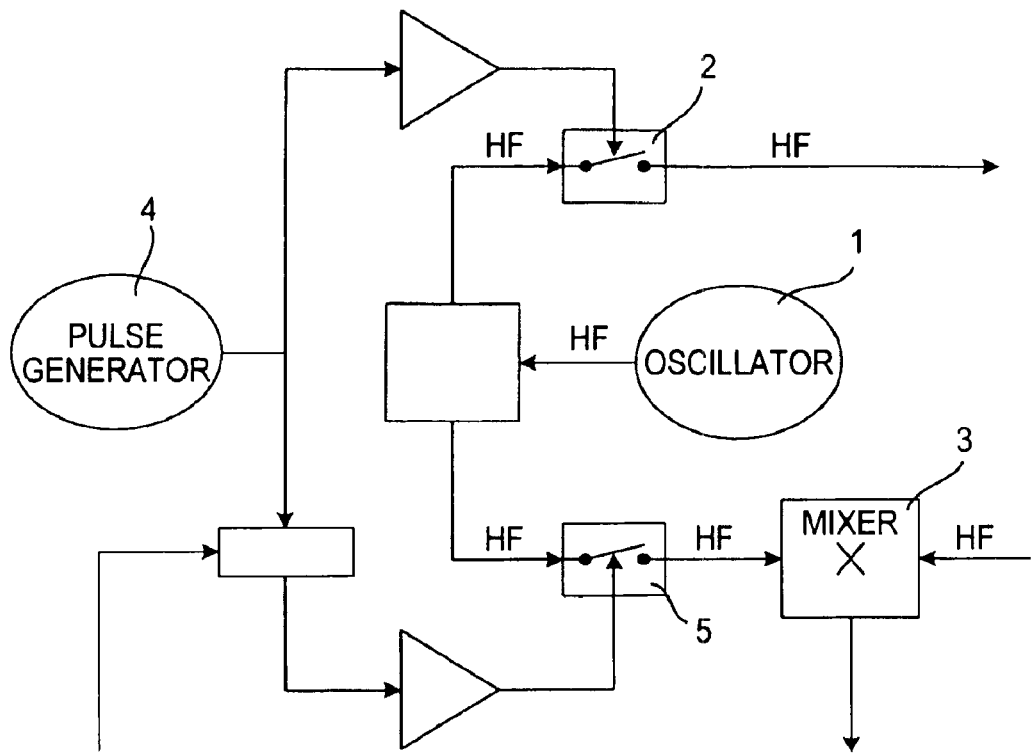
FIG. 1, a schematic illustration of the principle of a pulse radar sensor according to the known prior art.

In pulse radar sensors of the prior art, radar pulses are transmitted at a certain frequency at cyclical intervals, and the time until they are reflected by an object and received again is measured.

According to the present invention, the transmitted pulses are modulated by a binary phase-shift keying (BPSK) process. This solves the problem of the "dummy objects", which in the known proposals has not been solved until now.

First, the principle of the mode of operation of pulse radar sensors in the known prior art will be described in conjunction with FIG. 1.

To measure the time that a radar pulse requires to travel from the sensor to the object and back again, in addition to the one transmitted pulse (TX pulse), a second pulse (RX pulse) is also generated, which is delayed relative to the first pulse (TX pulse) by the transit time of the distance to be measured. By a mixing process (convolution) of the TX and RX pulse, it can be ascertained whether the time lag of the RX pulse matches the time during which the TX pulse was underway, since the mixer outputs a signal only when both pulses arrive simultaneously. At a certain frequency, called the measurement repetition frequency, for instance 5 MHz, one TX pulse and the associated RX pulse are generated. FIG. 1 illustrates this principle. The inverse of the measurement repetition frequency is the measurement cycle time.

An oscillator 1 generates a frequency in the radar range. Via a switch 2, the TX pulses are transmitted at the radar frequency. When these pulses are reflected by an object, they can be received at a receiving antenna.

In a mixer 3, the received pulses can be mixed with the RX pulses. If the TX pulse and RX pulse arrive simultaneously, the mixer 3 outputs a signal. The signal amplitude is dependent on the phase relationship of the two pulses to one another.

To monitor a certain measurement range, all the delay times corresponding to this measurement distance must be set in succession.

A pulse generator 4 causes the switches 2 and 5 to close at a frequency, for instance of 5 MHz. Thus one TX pulse and one RX pulse that belong together each are generated at this frequency.

By the principle described above, the mixer 3 displays an object only if the TX pulse and RX pulse arrive simultaneously at the mixer 3. In the standard case, this is possible only whenever the TX pulse was underway for precisely the same length of time as the associated RX pulse was delayed.

However, the problem arises that a TX pulse which was underway for a very long time does not overlap the associated RX pulse but instead arrives only with the next pulse, or the one after that.

An example will illustrate this in terms of FIG. 1:

If the pulse generator 4 operates at a frequency of 5 MHz, this is the case with objects that are at a distance of more than 30 m. 5 MHz corresponds to a period of 200 ns, and the radar pulses require the time of 200 ns to make a round trip of 30 m. An object that is located at a distance of 31 m and is large enough to reflect enough power to the sensor is accordingly displayed at 1 m, even though it is located outside the measurement range.

Figure 2:
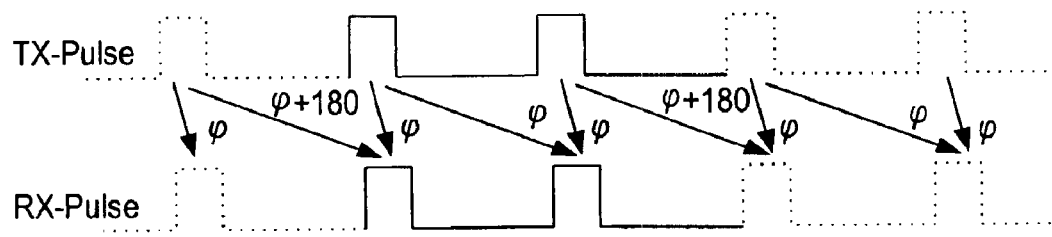
FIG. 2, a graph showing the phase shift of the TX and RX pulses by the method of the invention.

If now, by the method of the invention, a phase shift of 180° as shown in FIG. 2 is introduced, the pulses that do not belong together overlap, with a phase shift of 0° and a phase shift of 180° in alternation. In a sinusoidal function, however, the values at the phase $\phi$ and the phase $\phi+180°$ add up to zero. In FIG. 2, the curve represented by dotted lines illustrates a phase shift $\phi$, while the curve shown in solid lines represents a phase shift of $\phi+180°$. In the mixers employed, a signal occurs at the output in which the amplitude over the phase shift is also a sinusoidal function. Moreover, a lowpass filter is already achieved, which assures that a mean time value is formed by the output signal of the mixer.

It is not important precisely when the phase is switched over; it is important only that two successive pulses always have the same phase, and the next two pulses are shifted by 180°.

There is also the possibility that a TX pulse may not overlap the associated RX pulse or even the next RX pulse but only the RX pulse after that. To prevent this, instead of always two pulses, three pulses with the same phase relationship must always be transmitted. To prevent an overlap with the pulse following that as well, four pulses must have the same phase relationship. This could be continued on and on, if there were no limitation presented by the lowpass filter. In practice, however, an overlap only to approximately the pulse after the next one is necessary, because this already corresponds to a distance from the reflected object of 60 m.

At these distances, the power of the reflected pulse, because the power drops with the distance by the power of 4, is already so relatively slight that the size of possible reflection objects, given the power output by the sensors, no longer assumes logical values.

What is claimed is:

1. A method for eliminating dummy objects in short-range pulse radar sensors, in which radar pulses are transmitted at a defined frequency, and the time until they are reflected by an object and received again is measured, and besides the transmitted pulse (TX pulse), a delayed second pulse (RX pulse) is generated, the transmitted pulses (TX pulses) and the additionally generated second pulses (RX pulses), delayed relative to them are modulated by a binary phase-shift keying process,and wherein the transmitted pulses (TX pulse) and the additionally generated second pulses (RX pulses) delayed relative to them are modulated by introducing a phase shift of 180° between the transmitted pulses (TX pulses) and the delayed second pulses (RX pulses) in such a way that at least two successive pulses always have the same phase, and at least the next two pulses are shifted by 180°.

2. The method of claim 1, wherein three successive pulses have the same phase, and the three next pulses are shifted by 180°.

3. The method of claim 1, wherein four successive pulses have the same phase, and the four next pulses are shifted by 180°.

\* \* \* \* \*